United States Patent [19]

Kitagishi et al.

[11] Patent Number: 4,615,603
[45] Date of Patent: Oct. 7, 1986

[54] SINGLE LENS REFLEX CAMERA

[75] Inventors: Nozomu Kitagishi, Kanagawa; Susumu Itoh, Tokyo; Sayoko Amano, Kanagawa, all of Japan

[73] Assignee: Canon Kabushiki Kaisha, Tokyo, Japan

[21] Appl. No.: 656,170

[22] Filed: Sep. 28, 1984

[30] Foreign Application Priority Data

Oct. 5, 1983 [JP] Japan ................................ 58-186254

[51] Int. Cl.⁴ ...................... G03B 7/099; G03B 19/12
[52] U.S. Cl. ..................................... 354/479; 354/152
[58] Field of Search ............... 354/431, 479, 481, 152, 354/154, 480

[56] References Cited

U.S. PATENT DOCUMENTS

| | | | |
|---|---|---|---|
| 4,302,089 | 11/1981 | Fukuhara | 354/152 |
| 4,392,729 | 7/1983 | Tsunefuji | 354/152 |
| 4,431,285 | 2/1984 | Kajita et al. | 354/152 X |
| 4,437,740 | 3/1984 | Suzuki et al. | 354/152 X |
| 4,461,557 | 7/1984 | Kimura | 354/479 X |
| 4,508,439 | 4/1985 | Ohara et al. | 354/154 |

FOREIGN PATENT DOCUMENTS 4324735 12/1968 Japan .................................... 354/154

Primary Examiner—William B. Perkey
Attorney, Agent, or Firm—Toren, McGeady, Stanger, Goldberg & Kiel

[57] ABSTRACT

In the single lens reflex camera whose movable mirror for reflecting light from the photographic lens to the finder is made partly half-mirrored to give a portion of the light to the photosensitive element, the finder is provided with a focusing screen of high diffusing property, the movable mirror having a half-mirrored portion at the center of the entire area with the surrounding area being made perfectly reflective is provided with a pattern of finely divided areas some of which are half-mirrored and the others of which are perfectly reflective in gradually varying area ratios in a boundary area between the central and surrounding areas, and a mask is provided on the back surface of the movable mirror for shutting off the passed light through the finely divided area pattern.

12 Claims, 14 Drawing Figures

SINGLE LENS REFLEX CAMERA

BACKGROUND OF THE INVENTION

1. Field of the Invention

This invention relates to single lens reflex cameras with a movable mirror having a half-mirrored portion.

2. Description of the Prior Art

In general, the single lens reflex cameras of this kind have an optical system as shown in FIG. 1, where light passing through and emerging from a photographic lens 1 is reflected by a movable mirror 2 to a focusing screen 3 on which an object image is formed. This image is observed through a penta prism 4 and an eyepiece by the photographer. The half-mirrored portion of the movable mirror 2 passes a portion of the light from the photographic lens 1 to an auxiliary mirror 6 from which the light is reflected to a photosensitive element 7 constituting part of a light meter or a focus detector.

If such movable mirror of the single lens reflex camera is made half-mirrored over the entire area, it results in that, as shown in FIG. 2(a), besides the ordinary rays 10 reflected from the front surface of the half mirror, there are rays 12 passing through the thickness of the half mirror and reflected from the back surface thereof. Therefore, when a luminous object such as a fluorescent lamp lies in the target area, the field of view of the finder presents a ghost 9 in addition to the right object image 8 as shown in FIG. 2(b). Another disadvantage arising from making the entire area half-mirrored is that the viewfield of the finder becomes dark.

Also, in the past, as shown in FIG. 3(a), only an effective portion 14 of the movable mirror was made half-mirrored while the other portion 13 than that was made perfectly reflective, thereby the brightness of the finder image was improved, and the ghost from the back surface of the mirror was reduced. Since this mirror has, however, an abrupt change of reflectivity at the boundary between the central half-mirrored area and the outside total reflective area, a partial darkening 15 appers in the field of view of the finder as shown in FIG. 3(b). As the size of aperture opening of the diaphragm decreases, this becomes more prominent, causing the finder image to look unpleasant.

To improve the partial darkening of the viewfield along with the brightness of the finder image and the ghost, the movable mirror may be constructed in such a way as shown in FIG. 4(a). This is to make it a really half-mirrored so that the area ratio of permeability at the central portion is highest, and the ratio of the total reflection areas gradually increases with increase in the distance from the center to the margin. With the use of such a mirror, because the fine pattern lies in the central portion of highest frequency of use in the finder, flare is produced by diffraction in the image formed in the center of the viewfield of the finder. Particularly the center of the viewfield of the finder is used for focusing adjustment. As the image is associated with flare, therefore, the visual focusing is difficult to perform. Another problem is that when the diaphragm is closed down or when the effective F-number is slow as in closeup photography, the pattern that was not conspicuous gives birth to a hazy image of itself as illustrated in FIG. 4(b), rendering the object image superimposed on that image unpleasant to look, and also making it substantially impossible to perform accurate focusing.

To solve these problems, such a movable mirror as shown in FIG. 5(a) has recently been proposed. This movable mirror 2 has a boundary area of which reflectance gradually increases with increase in the distance from the central or half-mirrored area 14 to the total reflection area 13. The production technique for such movable mirror is that when a reflective coating is applied to a glass plate, a vacuum evaporation mask 17 is set up slightly away from the surface of a glass substrate 2 as shown in FIG. 5(c). It is said that by this method the thickness of the perfectly reflective coating applied to the half reflective coating on the glass substrate can be gradually increased with increase in the reflectance. Upon making experiments according to this method, however, the following defects have been found out:

(1) The adjustment of the reflectance to a gradual variation is very difficult to control. That is, though it does not matter so much when the mask 17 is accurately aligned to an evaporation source 18 as shown in FIG. 5(c), in case when the accurate alignment is not assured as in the mass production, the gradient of reflectance changes from mirror to mirror.

(2) With the gradually varying thicknesses of the total reflection coating in the boundary area as shown in FIG. 5(d), as the thinner part becomes equivalent to one layer of the multi-layer coating, the color characteristics of the half mirror at that part is caused to change. As a result, the boundary between the total reflection area and the half-mirrored area is colored. In the field of view of the finder, therefore, a colored ring 16 appears as shown in FIG. 5(b), giving unpleasant impression to the observer.

It is therefore an object of the present invention to eliminate the above-described drawbacks and to provide a single lens reflex camera with a focusing screen made to have a high diffusing property, a movable mirror made constructed in such a way that the boundary area between the total reflection area and the half-mirrored area is finely divided into parts, some of which are perfectly reflective and the others of which are half reflective, in gradually varying ratios of the sizes of the areas, and mask positioned on the back surface of said movable mirror for shutting off the light passed through the boundary area of the finely divided pattern, thereby giving an advantage that despite the use of the half-mirrored area, the finder functions as if the movable mirror is perfectly reflective over the entire area thereof.

Other objects of the present invention will become apparent from the following detailed description of embodiments thereof with reference to the accompanying drawings.

DETAILED DESCRIPTION OF THE PREFERRED EMBODIMENTS

The present invention will next be described in connection with an embodiment thereof by reference to FIGS. 6 and 7.

Figure 1:
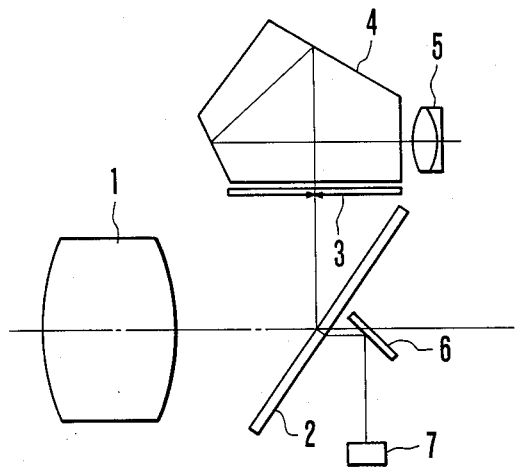
FIG. 1 is a schematic sectional view of the optical system of the conventional camera.
Figure 2A:
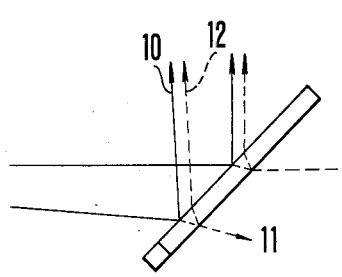
FIG. 2(a) is a diagram illustrating different reflections of rays from a movable mirror of FIG. 1 which is half-mirrored over the entire area thereof.
Figure 2B:
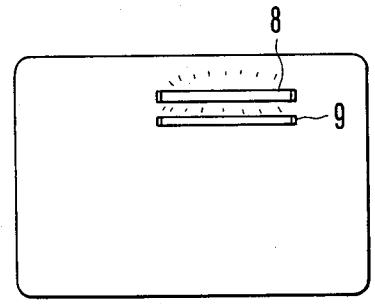
FIG. 2(b) is a plan view of the field of view of the finder employing the mirror of FIG. 2(a).
Figure 6:
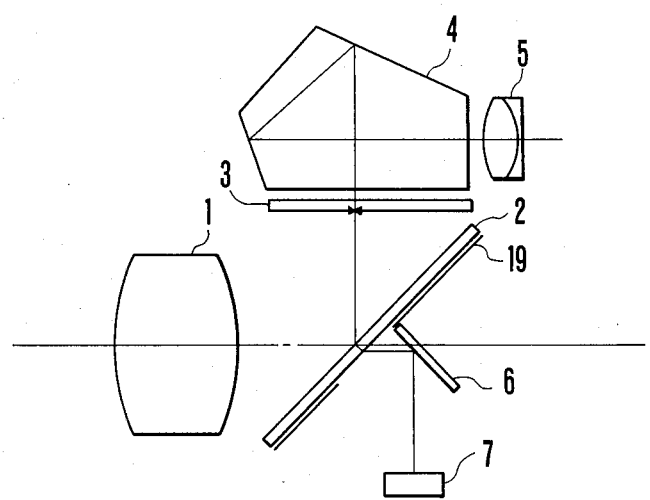
FIG. 6 is a schematic sectional view of an optical system of an embodiment of the single lens reflex camera according to the present invention.

FIG. 6 illustrates the optical construction and arrangement of the camera, wherein the same reference characters have been employed to denote the similar parts to those shown in FIG. 1.

1 is a photographic lens; 2 is a movable mirror; 3 is a focusing screen; 4 is a penta prism; 5 is an eyepiece; 6 is an auxiliary mirror; and 7 is a photosensitive element.

Therefore, the light passed through the photographic lens 1 is reflected by the movable mirror 2 to the focusing screen. An object image formed on this focusing screen 3 is observed by the photographer looking through the eyepiece 5. Also that part of the light which has passed through a half-mirrored portion of the movable mirror 2 is reflected from the auxiliary mirror 6 to the photosensitive element 7, thereby light metering or in-focus detecting is performed.

Figure 7:
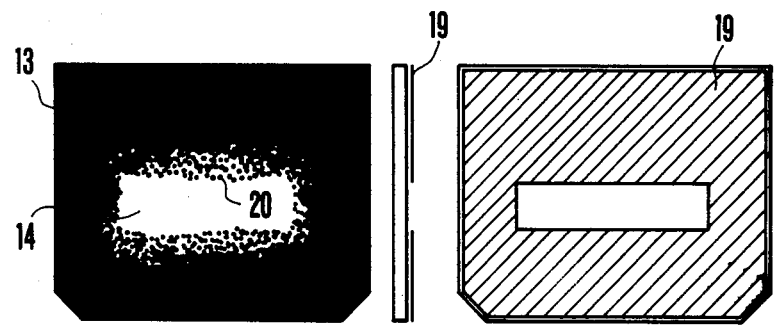
FIG. 7 illustrates the details of the movable mirror of FIG. 6.

According to the present invention, the focusing screen 3 is made to have a high diffusing property, and the movable mirror 2 is made constructed in such a way as shown in FIG. 7 that the central area 14 is half-mirrored, and an environment area 13 is perfectly mirrored with a boundary area therebetween being made of a fine pattern 20 of which the area ratio of total reflection gradually increases as it approaches the environment area. Also the passed light through the fine pattern 20 is cut off by a mask 19 (also see FIG. 6) on the back surface of the movable mirror 2. This mask 19 has an aperture in alignment with the half-mirrored area 14.

The half-mirrored area 14 is a half mirror of the amplitude splitting type, while the fine pattern 20 is a half mirror of the area type.

The size of the half-mirrored area 14 becomes smaller than heretofore was necessary to operate the photosensitive element 7, thereby it being made possible to increase the brightness of the finder image.

Figure 3A:
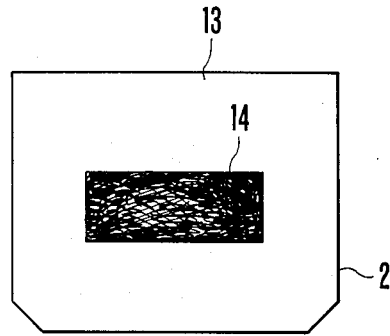
FIG. 3(a) is a plan view of another example of the movable mirror which is half-mirrored in a central area.
Figure 3B:
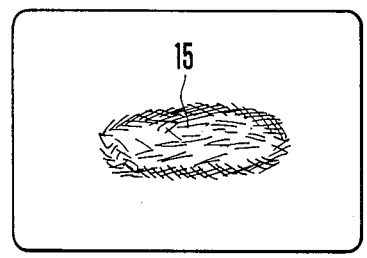
FIG. 3(b) illustrates the field of view of the finder employing the mirror of FIG. 3(a).

Also, since the amount of reflected light from the boundary area gradually increases with increase in the distance from the half-mirrored area 14 to the total reflection area, and the diffusing property of the focusing screen is higher, the partial darkening at the center is less prominent than when the conventional mirror of FIGS. 3(a) and 3(b) is employed. Moreover, when the size of the aperture opening is small, the center of the viewfield is clear and, therefore, does not impede focusing adjustment. Also, because of the half-mirrored area 14 of smaller size, the ghost is reduced. Moreover, the light emerging from the boundary area of fine pattern 20 is shut off by the mask 19 so that there is no influence of diffraction by the pattern.

The movable mirror can be made up by applying a half mirror coating by vacuum evaporation techniques followed by patterning another coating of aluminium or other reflective material by photoetching techniques.

Figure 8:
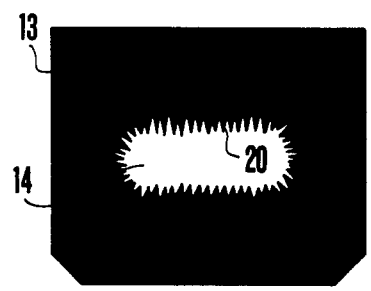
FIG. 8 is a plan view illustrating another example of the movable mirror of FIG. 7.

FIG. 8 illustrates another example of the pattern. For such pattern the vacuum evaporation technique can be used in applying the second coating also. The mask 19 is not necessarily in contact with the back surface of the mirror 2, and may be positioned away therefrom or adjacent the auxiliary mirror to effect an equivalent result.

In the above embodiment, the fine pattern 20 is formed by a great number of dots as shown in FIG. 7 or in a saw-toothed shape as shown in FIG. 8. However, the fine pattern 20 may be formed in the shape of meshes.

Further, in the above embodiment, the total reflection area 13 is formed at the marginal portion of the movable mirror 2. However, a half mirror of the area type of nearly total reflection quality may be formed in a very coarse pattern of meshes. In this instance, if the fine pattern 20 is formed in a pattern of meshes finer than that at the marginal portion, more advantageous effects can be obtained.

As has been described in greater detail above, according to the present invention, the movable mirror of such construction as shown in FIG. 7, the focusing screen of diffusing property, and the ghost cut mask when used in combination produce the following advantages:

(1) The viewfield of the finder is brighter.

(2) There is little partial darkening not only at the full open aperture but also when the size of aperture opening is decreased.

Figure 5A:
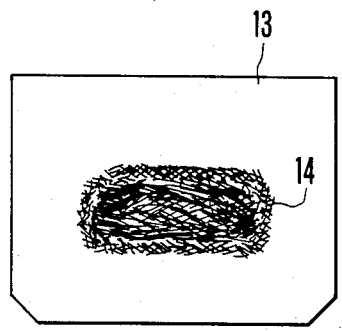
FIG. 5(a) is a plan view of a furthermore example of the movable mirror of FIG. 1 which is made up by vacuum evaporation techniques.
Figure 5B:
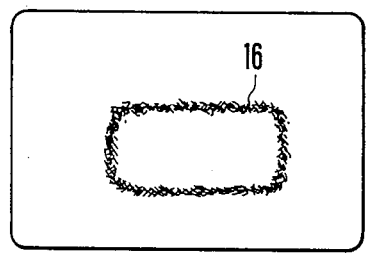
FIG. 5(b) illustrates the field of view of the finder employing the mirror of FIG. 5(a).

(3) No coloring as shown in FIG. 5(b) appears in the viewfield.

Figure 4A:
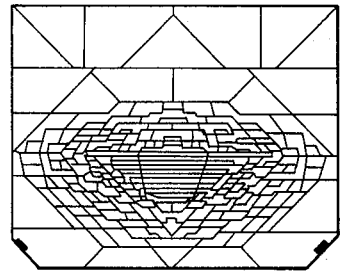
FIG. 4(a) is a plan view of still another example of the movable mirror of FIG. 1 which has a complicated fine pattern of total reflection areas in varying ratios with distance from the center to the margin.
Figure 4B:
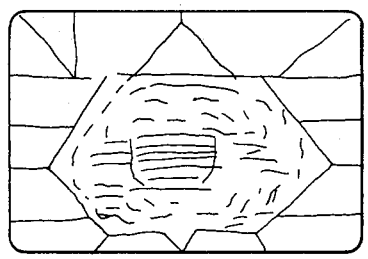
FIG. 4(b) illustrates the field of view of the finder employing the mirror of FIG. 4(a).

(4) The central area of the viewfield which is used for visual focusing is cleared of such objectionable pattern as shown in FIG. 4(b) even when the size of aperture opening is small.

(5) The flare in the central area is reduced, thereby the visual focusing operation is made easier.

(6) The ghost is reduced remarkably.

(7) The light given to the photosensitive element is freed from noise that lowers the image quality therefor.

(8) Stray light is prevented from entering the photosensitive element.

Figure 5C:
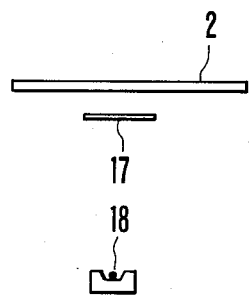
FIG. 5(c) is a side elevational view of a vacuum evaporation apparatus for the mirror of FIG. 5(a).
Figure 5D:
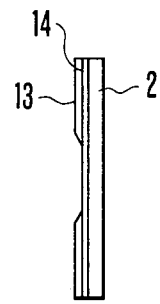
FIG. 5(d) is a cross-sectional view of the movable mirror of FIG. 5(a).

(9) Stable mass production is possible. (There is no need to employ a delicate production method as shown in FIG. 5(c)).

What is claimed is:

1. A light receiving device for a single lens reflex camera comprising:

(a) a photographic lens;

(b) a movable mirror for reflecting the passed light of said photographic lens, said movable mirror having its central portion made half-mirrored, and its environment portion made totally reflective with a boundary portion between the central and environment portion being provided with a fine pattern of which the area ratio of the total reflection parts to the half-mirrored parts gradually varies;

(c) a mask provided behind the back surface of said movable mirror, said mask shutting off the permeating light from the fine pattern and allowing the permeating light from the half-mirrored portion to pass therethrough; and (d) a light receiver positioned to receive the passed light through said movable mirror and said mask.

2. A light receiving device according to claim 1, further comprising:
a focusing screen on which the light emerging from said photographic lens is reflected by said movable mirror to form an image.

3. A light receiving device for a single lens reflex camera comprising:
(a) a photographic lens;
(b) a movable mirror for reflecting the passed light of said photographic lens, said movable mirror having a central portion which is a half mirror of the amplitude splitting type, an environment portion which is a half mirror of the area type of nearly total reflection quality and a boundary portion between said central portion and said environment portion which is a half mirror of the area type having a transmission factor greater than said environment portion;
(c) a light receiver positioned to receive the light passed through said movable mirror; and
(d) a mask provided behind the back surface of said movable mirror for restricting undesirable light from passing through the boundary portion of said light receiver and allowing the permeating light from the central portion to pass therethrough.

4. A light receiving device according to claim 3, wherein said half mirror of the area type is formed in a pattern of meshes.

5. A light receiving device for a single lens reflex camera comprising:
(a) a photographic lens;
(b) a movable mirror for reflecting the passed light of said photographic lens, said movable mirror having a half mirror central portion, and a mesh pattern mirror marginal portion around the central portion;
(c) light shielding means for admitting almost all light from the central portion of the movable mirror and shielding almost all light from portions other than the central portion, and
(d) a light receiver for receiving the light passing through the movable mirror and the light shielding means.

6. A light receiving device for a single lens reflex camera according to claim 5, in which said marginal portion has dimensions whose proportions are increasingly reflective as the marginal portion departs from the central portion.

7. A light receiving device for a single lens reflex camera comprising:
(a) a photographic lens; and
(b) a movable mirror for reflecting the light passed through said photographic lens, said movable mirror having a half mirror central portion, an environment portion of nearly total reflection quality, and a boundary portion between said central portion and said environment portion with a pattern having a varying area ratio of total reflection parts to half mirrored parts;
(c) light shielding means for admitting almost all light from the central portion of the movable mirror and shielding almost all light from portions other than the central portion; and
(d) a light receiver for receiving the light passing through the movable mirror and the light shielding means.

8. A camera having a finder apparatus, comprising:
a movable mirror for reflecting light passing through a photographic lens to the finder apparatus, said mirror having a central area composed of a half-transparent mirror of amplitude splitting type from which central area the reflection increases toward the periphery, and outer area including a fine pattern mirror;
light receiving means for producing an electric signal by reception of the light passing through the movable mirror; and
restriction means, arranged between the light receiving means and the movable mirror, for restricting the light passing through the outer area to prevent undesirable effect on the electrical signal.

9. A camera according to claim 8, in which the said outer area has a mesh pattern mirror.

10. A camera according to claim 8, in which the outer area has a dot pattern mirror.

11. A camera according to claim 8, in which the said outer area has a saw-toothed pattern mirror.

12. A light receiving device for a single lens reflex camera comprising:
(a) a photographic lens;
(b) a movable mirror for reflecting the passed light of said photographic lens, said movable mirror having a half mirror central portion, an environmental portion which is a half mirror of the area type of nearly total reflection quality and a boundary portion between said central portion and said environment portion which is a half mirror of the area type having a transmission factor greater than said environment portion;
(c) light shielding means for admitting almost all light from the central portion of the movable mirror and shielding almost all light from portions other than the central portion; and
(d) a light receiver for receiving the light passing through the movable mirror and the light shielding means.

* * * * *